United States Patent
Haga et al.

Patent Number: 5,876,012
Date of Patent: Mar. 2, 1999

[54] VIBRATION CANCELLATION APPARATUS

[75] Inventors: Takahide Haga, Kawasaki; Katsuhide Watanabe, Fujisawa, both of Japan

[73] Assignee: Ebara Corporation, Tokyo, Japan

[21] Appl. No.: 880,640

[22] Filed: Jun. 23, 1997

[30] Foreign Application Priority Data

Jun. 21, 1996 [JP] Japan .................................. 8-181473

[51] Int. Cl.[6] .................................................. F16M 1/00
[52] U.S. Cl. ............................................. 248/550; 248/638
[58] Field of Search ................................. 248/550, 636, 248/638, 562; 188/267, 378, 136

[56] References Cited

U.S. PATENT DOCUMENTS

| | | | |
|---|---|---|---|
| 4,464,030 | 8/1984 | Gale et al. .............................. | 396/548 |
| 4,821,205 | 4/1989 | Schutten et al. . | |
| 4,999,534 | 3/1991 | Andrianos .............................. | 310/90.5 |
| 5,285,995 | 2/1994 | Gonzalez et al. . | |
| 5,293,969 | 3/1994 | Yamaoka et al. ....................... | 188/267 |
| 5,592,791 | 1/1997 | D'Annunzio et al. .................. | 52/167.2 |
| 5,713,438 | 2/1998 | Rossetti et al. ......................... | 188/378 |

FOREIGN PATENT DOCUMENTS

| | | |
|---|---|---|
| 2-266128 | 10/1990 | Japan . |
| 2-266132 | 10/1990 | Japan . |
| 2-266134 | 10/1990 | Japan . |
| 7-91485 | 4/1995 | Japan . |
| 7-139582 | 5/1995 | Japan . |

*Primary Examiner*—Ramon O. Ramirez
*Assistant Examiner*—Robert Lipcsik
*Attorney, Agent, or Firm*—Wenderoth, Lind & Ponack, L.L.P.

[57] ABSTRACT

A compact vibration cancellation apparatus based on a combination of air springs and electromagnetic actuators with smaller power capacity enables an anti-vibration table to be maintained in a level position even when the center of gravity of the anti-vibration table moves a large distance because of a movement of objective equipment on the table. The vibration cancellation apparatus is operable for isolating floor vibration or for canceling vibration of the objective equipment on the anti-vibration table. The apparatus includes displacement sensors, acceleration sensors, a levitation position control device, a vibration canceling control device, and air spring actuators for supporting four corners of the anti-vibration table by air pressure. The air pressure in each air spring actuator is controlled in response to a change of load which corresponds to a movement of the center of gravity caused by movement of the objective equipment on the anti-vibration table.

8 Claims, 5 Drawing Sheets

VIBRATION CANCELLATION APPARATUS

BACKGROUND OF THE INVENTION

1. Field of the Invention

The present invention relates in general to a vibration cancellation apparatus for isolating floor vibrations or canceling vibrations of objective equipment thereon to affect the production yield or measurement precision of objective equipment such as semiconductor fabrication devices and electron-microscopes. Particularly the invention relates to a vibration cancellation apparatus that provides a combined action of air springs and electromagnetic actuators, in which vertical support of load is primarily provided by air spring actuators, and fine control of vibrations is primarily provided by electromagnetic actuators.

2. Description of the Related Art

Conventionally, vibration-sensitive equipment, such as electron-microscopes and semiconductor fabrication equipment whose performances are adversely affected by vibrations, have been installed on the floor, by way of some vibration isolation apparatuses such as air springs and rubber sheets. Replacing the conventional air springs and rubber-based arrangements as vibration isolation devices, high performance vibration cancellation apparatuses based on magnetic levitation have been developed.

Also a combination of air springs and an electromagnetic actuator is known for isolating floor vibrations and canceling vibrations of the objective equipment on an anti-vibration table. According to these apparatuses, both air springs and electromagnetic actuators are used to actively control levitating positions and to cancel vibrations in the vertical direction. The objective equipment is supported on an anti-vibration table whose four corners are supported by actuators which include air springs and electromagnetic actuators. Three proximity sensors and three accelerometers are used to detect table displacements and accelerations, and responding actions are quickly applied through digital controllers to the pneumatic actuators and the electromagnetic actuators.

In reviewing the existing techniques of vibration canceling control, based on a combination of air springs and electromagnetic actuators, when the center of gravity of the table moves by movement of the objective equipment placed on the anti-vibration table, two methods of leveling the anti-vibration table may be considered:

(1) To control the air pressures of the air spring actuators for leveling the table, or (2) To control the vertical positions of the table by operating the electromagnetic actuators for leveling the table.

However, these approaches present the following problems.

(1) Because of the slow response characteristics of air springs actuators, when the center of gravity of the table moves at high velocities, the air spring actuators are not able to respond in a timely manner to keep the anti-vibration table level; and (2) Although electromagnetic actuators are able to respond quickly for keeping the anti-vibration table level, it is necessary to increase the capacity of the electromagnetic actuators such that one of the actuators can deal with the maximum anticipated load of the objective equipment, including the weight of the table. When the center of gravity of the objective equipment moves to a corner of the table, one of the electromagnetic actuators must support all of the weight in order to keep the table level. One of the problems with this approach is that the cost of the system becomes high and the system size becomes large.

SUMMARY OF THE INVENTION

It is therefore an object of the present invention to provide a compact vibration cancellation apparatus based on a combination of air springs and electromagnetic actuators with smaller power capacity to enable the anti-vibration table to be maintained in a level position even when the center of gravity of the anti-vibration table moves a large distance because of a movement of the objective equipment on the table.

According to the present invention, there is provided a vibration cancellation apparatus which includes at least three displacement sensors for detecting vertical positions and outputting displacement signals, acceleration sensors for detecting vertical accelerations of the anti-vibration table and outputting acceleration signals, a levitation position control means for controlling the electromagnetic actuators according to output signals of a first compensation circuit which are based on displacement signals from the displacement sensors. The vibration cancellation apparatus also includes a vibration canceling control means for controlling the electromagnetic actuators according to output signals of a second compensation circuit which are based on acceleration signals from the acceleration sensors, and air spring actuators for supporting four corners of the anti-vibration table by air pressure. The air pressure of each air spring actuator is independently adjustable by a respective air pressure control device. The air pressure in each air spring actuator is controlled in response to a change of load which corresponds to a movement of the center of gravity caused by movement of the objective equipment on the anti-vibration table.

Accordingly, actions for maintaining the table in a level position are provided by two separate control actions: one of which controls the electromagnetic actuators for the normal levitated position control of the table sensed by the displacement sensors; and another which controls the air spring actuators for the air pressure to maintain the table level.

According to the present invention, there is also provided a vibration cancellation apparatus wherein the air pressures for the air spring actuators are adjusted according to position signals of the objective equipment on the anti-vibration table, and the position signals are converted to the air pressure signals by a feed forward controller.

According to the present invention, there is also provided a vibration cancellation apparatus wherein the acceleration sensors are installed in a location different from the electromagnetic actuators, and control devices are used to convert detected signals into equivalent action point signals for controlling the electromagnetic actuators at the action-points.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENTS

Figure 1:
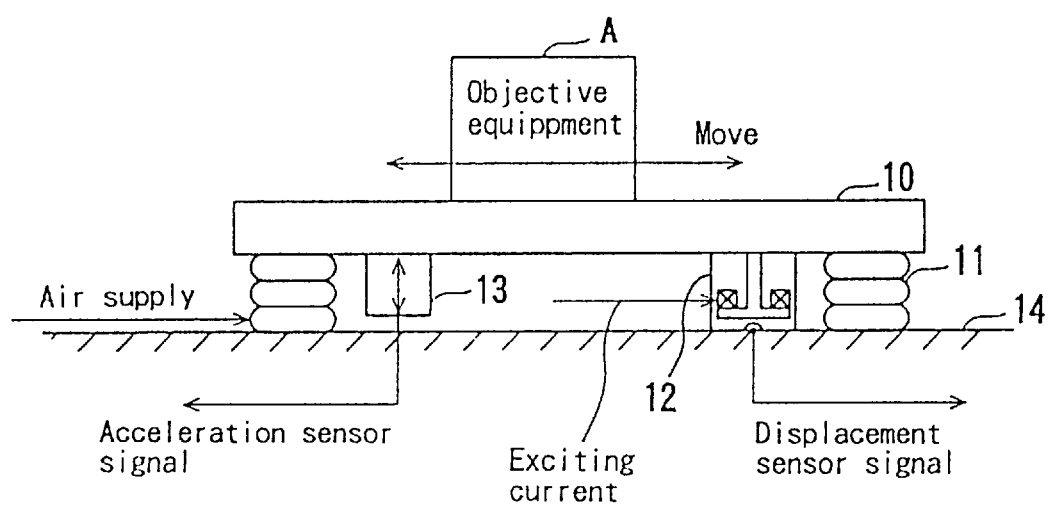
FIG. 1 is a schematic elevation view of a vibration cancellation apparatus with an anti-vibration table having pneumatic actuators and electromagnetic actuators.

As shown in FIG. 1, a vibration cancellation apparatus comprises an anti-vibration table 10, air spring actuators 11, electromagnetic actuators 12, acceleration sensors 13 and so on. The anti-vibration table 10 has placed thereon an objective equipment A, such as an electron microscope or a semiconductor fabrication apparatus. The table 10 is supported at its four corners with air springs 11 operative in the vertical direction. The bottom ends of the air springs 11 are fixed on a common base 14 which is fixed to an installation floor. Acceleration sensors (hereinbelow referred to as accelerometers) 13 are disposed on the lower side of the table 10 for detecting acceleration of the table in the vertical direction.

Figure 2:
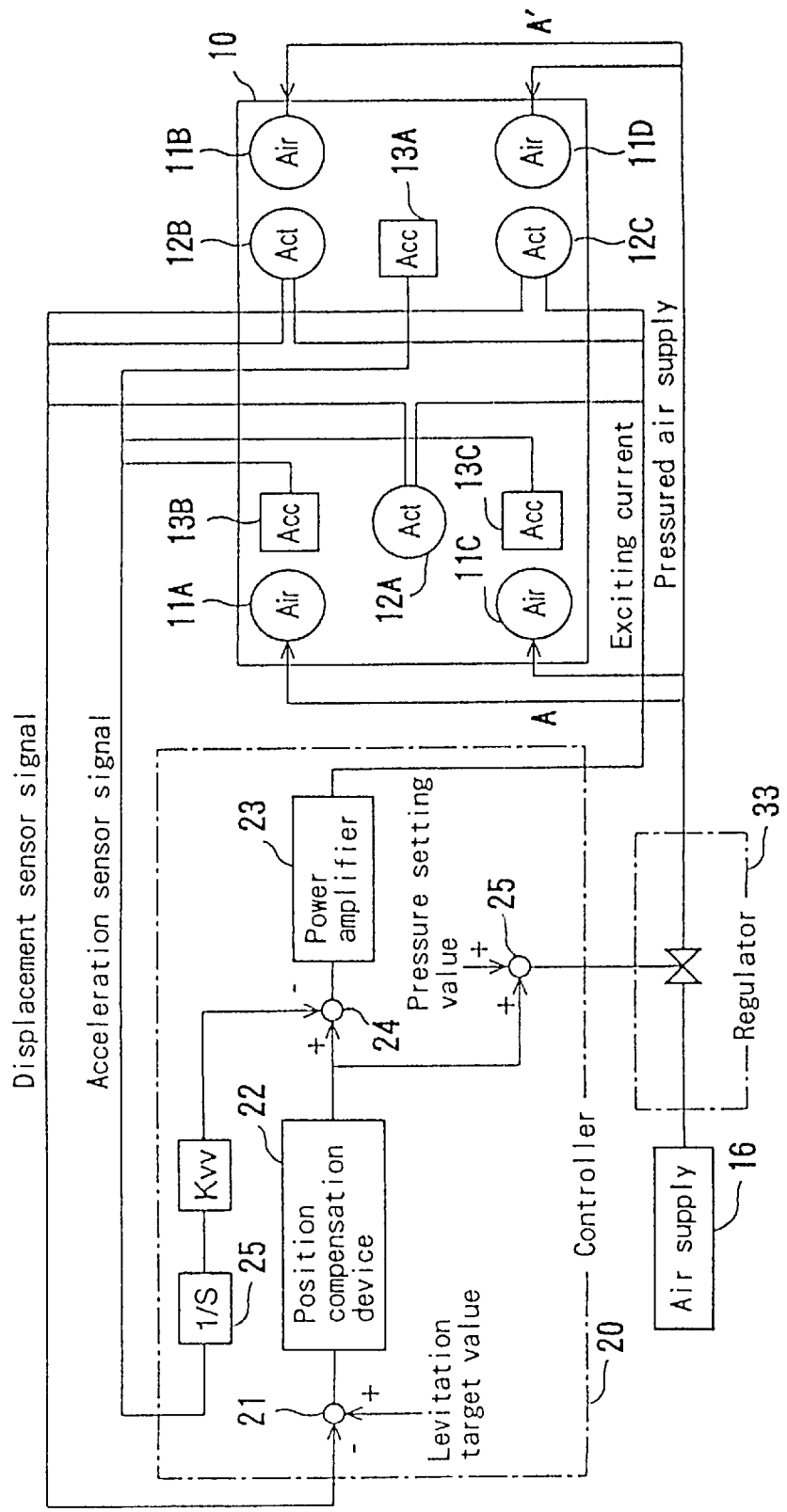
FIG. 2 is a schematic block diagram of a first embodiment of the anti-vibration system.

As shown in FIG. 2, air springs 11A, 11B, 11C and 11D support the four corners of the table 10. Three electromagnetic actuators 12A, 12B and 12C are placed at different locations from the locations of the accelerometers 13A, 13B and 13C which are active in the vertical direction. A displacement sensor is provided within each of the electromagnetic actuators 12A, 12B and 12C for detecting the displacement of the table in the vertical direction.

A control method for isolating floor vibrations and canceling vibrations of the objective equipment will be described as follows with reference to FIGS. 2 and 3. Displacement signals generated by the displacement sensors in each of the electromagnetic actuators 12A, 12B and 12C are forwarded to a controller section 20 and are compared with target levitation positions (normal levitation positions without vibrations). Differences between the target values and the sensed values are compared by comparator 21, and difference signals are forwarded to position compensation device 22, which outputs a compensation signal, to enable levitation of table 10 at the target position by the electromagnetic actuators. The compensation signal, after being amplified in an electrical amplifier 23, is supplied to the respective coils of the electromagnetic actuators 12A, 12B and 12C.

The acceleration signals in the vertical direction detected by the accelerometers 13A~C are forwarded to the controller 20, and integrated by integrator 25 to be converted to velocity signals. The velocity signals are multiplied by their respective gain coefficients Kvv to be compensation signals for canceling vibrations detected by the accelerometers, and are added in adder 24 to position compensation signals output from the position compensation device 22. These signals are amplified in the amplifier 23, and are supplied to the respective coils of the electromagnetic actuators 12A, 12B and 12C.

Position compensation signals output by position compensation device 22 based on the sensed positions of the table 10 in vertical direction are forwarded to pressure control devices for controlling air pressure of the air springs. The position compensation signals are forwarded to a control output distributor 31 (illustrated in FIG. 3), and are converted to equivalent pressure control signals for the on-site air springs to enable levitation of the table 10 at the target position, are multiplied by a gain coefficient KAP, and are added to the target pressure value in the adder 25. The air pressures in the springs 11A, 11B, 11C and 11D communicating with an air supply source are adjusted through a regulator 33 to correspond with the output signals of position compensation device 22. The table 10 is kept level in the target levitation position by adjustment of the air pressures, even though the load is changed at each air spring of the four corners.

Therefore, when an objective equipment A, placed on the table 10, is stationary at a certain location near the center of the table 10, the applied load is supported primarily by the air springs 11A, 11B, 11C and 11D by setting the pressure at appropriate values, and the electromagnetic actuators 12A, 12B and 12C do not substantially take part in sharing the applied load. This condition represents the normal condition for these electromagnetic actuators, and any deviations from the normal condition caused by vibrations are sensed by the accelerometers, and are compensated under the control of the controller section 20 (second compensation circuit).

When the objective equipment A moves a large distance on the anti-vibration table 10, the center of gravity of the table 10 moves causing a change of the load distribution among the air springs 11A, 11B, 11C and 11D, and displacements in the vertical direction are changed among the displacement sensors. At this time, so as to keep the table 10 in a normal level position, control forces for leveling the table must be increased. The magnitudes of the changes in the control forces appear as the output signals of the position compensation device 22 derived from displacement sensor signals, and they correspond to control force parameters for the air pressures in the air springs 11A, 11B, 11C and 11D. The output signals from the position compensation device 22 are used to alter the pressures in the air springs via a transformation of data between the positions of the displacement sensors and the positions of the air springs. Namely, the output signal of the position compensation device 21 is inputted to adder 25 via control output distributor 31. The air pressures are adjusted according to a changing situation with respect to the distribution of load on each of the air springs to keep the table 10 in a level position.

Therefore, even if the objective equipment A moves a large distance and the center of gravity of the table 10 moves a large distance, the required changes in the respective load from the normal condition are effected together by the levitation position control action of the electromagnetic actuators and by the air pressure control action of the air springs. The levitation position control action by the electromagnetic actuators provides high speed and precise response for leveling the table. The air pressure control action by the air springs provides no consumption of electric power to support substantially full load, but the response is slow. Therefore two kinds of control actions work complementarily with each other. In other words, even the relatively low power capacity of electromagnetic actuators are sufficient to provide the necessary compensation currents for keeping the table 10 level when the center of gravity moves a distance.

Figure 3:
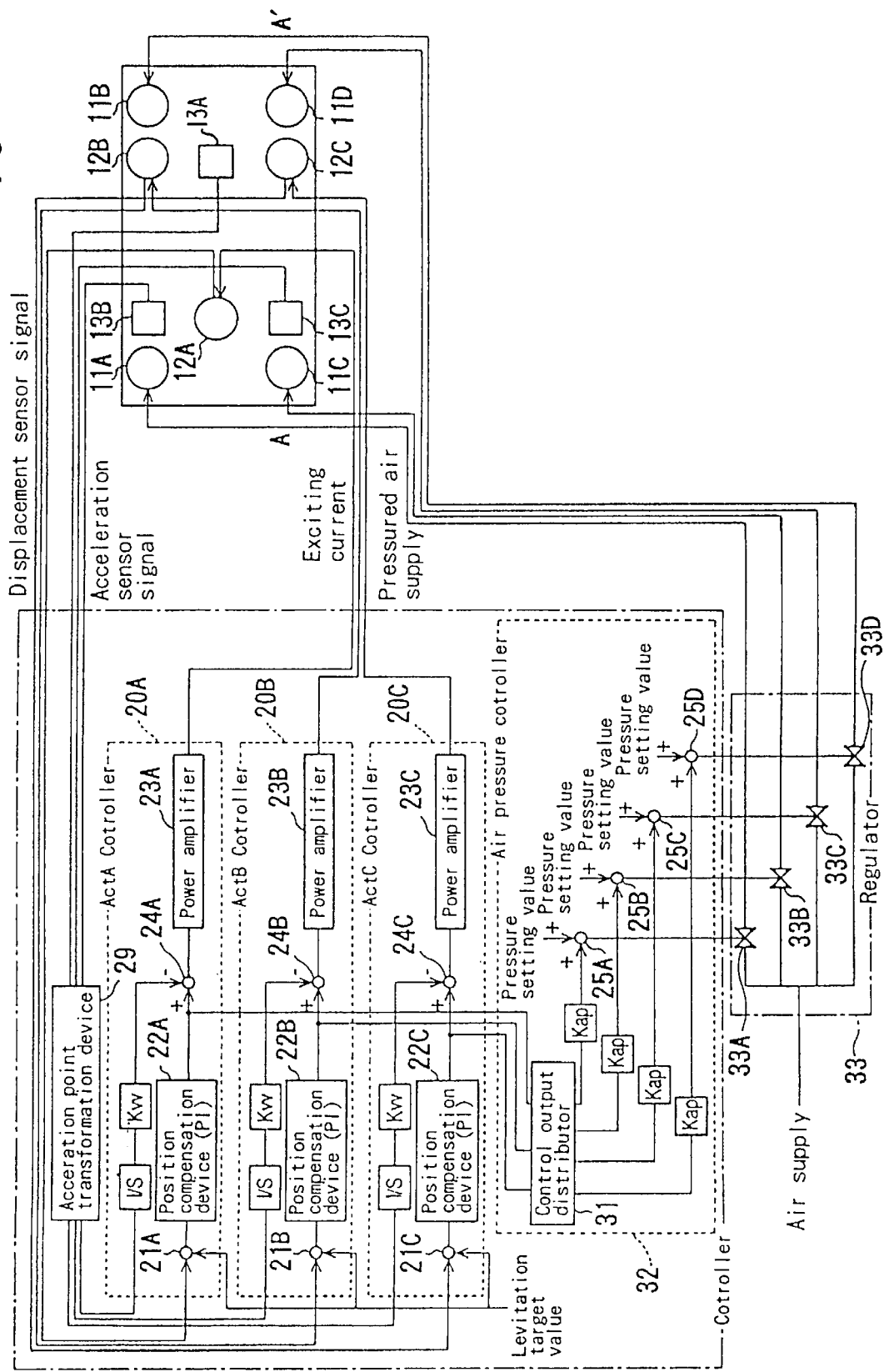
FIG. 3 is a detailed representation of control circuits for the first embodiment.

FIG. 3 shows the details of a control circuit block diagram presented in FIG. 2.

The acceleration values in the vertical direction of the table 10 detected by the accelerometers 13A, 13B and 13C, are different from the acceleration values at the actual action points where the actuations are applied. Therefore, the output values from the accelerometers 13A, 13B and 13C are inputted into acceleration point transformation device 29 which transforms the acceleration value from an acceleration value at the detected point to an acceleration value at the action point.

The output signals from the acceleration point transformation device 29 for each of the electromagnetic actuators 12A, 12B and 12C are inputted into respective controllers 20A, 20B and 20C. The output signals from the displacement sensors, housed in the electromagnetic actuators 12A, 12B and 12C, are also inputted into the corresponding control circuits 20A, 20B and 20C. The displacement signals are input into the respective adders 21A, 21B and 21C, and are compared with the target levitation values. The difference value between the target and current values are input into the individual position compensation devices 22A, 22B and 22C. The output signals of the individual position compensation devices are input into the adders 24A, 24B and 24C, respectively, for the electromagnetic actuators, as well as into the control output distributor 31 of the pressure control device for the air springs.

As in the case of the acceleration point transformation device 29, because of the difference in the respective points between the measuring sensors and on-site air actuators of the air springs, the control output distributor 31 is used to convert the measured displacement signals to actuation-point control signals required by the air actuators. In the adders 24A, 24B and 24C, vibration compensation signals (which are computed by integrating the acceleration signals from the accelerometers and multiplying the integration result by a coefficient Kvv) are added to position compensation signals from the displacement sensors. The added results (signals) are amplified in the respective amplifiers 23A, 23B and 23C, and are supplied as excitation current to the windings of the respective electromagnetic actuators 12A, 12B and 12C. The result is that the electromagnetic actuators 12A, 12B and 12C perform high precision vibration canceling control as well as keeping levitation position of the table 10 to its target position with high speed response.

In the meantime, the compensation signals for the air springs, based on the displacement signals from the displacement sensors, are multiplied by a coefficient $K_{AP}$ after being output from the control output distributor 31 and are input into the adders 25A, 25B, 25C and 25D, where they are added to the target values of the air pressure settings. The regulator valves 33A, 33B, 33C and 33D of the regulator 33 are adjusted according to the results of the added process.

The air pressures supplied from the air pressure supply source are thus adjusted and applied to each of the air springs 11A, 11B, 11C and 11D, so that, even if the load for the air springs is changed, the table 10 can be maintained level. The position adjustment action by air pressure control exhibits a comparatively slow response, but the electromagnetic actuators have already been used to provide high speed compensation to the changes in the levitation forces so that the overall system response is quite superior to any results obtained by the conventional schemes for leveling compensation.

Various circuit elements, including the position compensation device 22 of FIG. 1 (22A–C of FIG. 3), the adder 24 of FIG. 2 (24A–C of FIG. 3), the power amplifier 23 of FIG. 2 (23A–C of FIG. 3), and the actuators 12A–C operate as levitation position control means. Further, various circuit elements, including circuit elements "1/S" in FIGS. 2 and 3, the power amplifier 23 in FIG. 2 (23A–C in FIG. 3), and the actuators 12A–C operate as vibration canceling control means. Circuit elements including the adder 21 of FIG. 2 (21A–C of FIG. 3), and the position compensation device 22 of FIG. 2 (22A–C of FIG. 3) operate as a first compensation circuit. Circuit elements, including circuit element "1/S" and "Kvv" of FIGS. 2 and 3 operate as a second compensation circuit.

Figure 4:
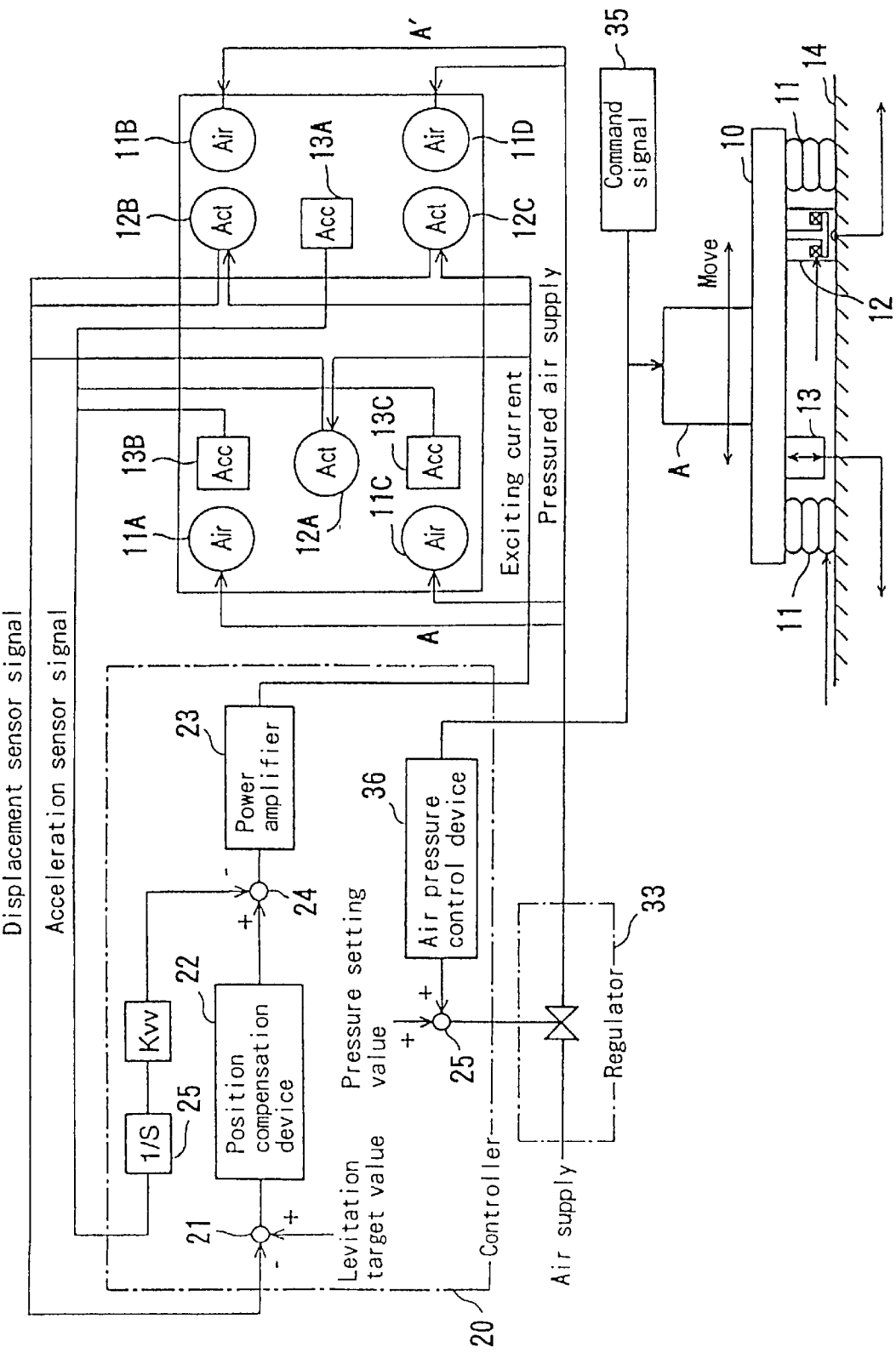
FIG. 4 is a schematic block diagram of a second embodiment of the anti-vibration system.
Figure 5:
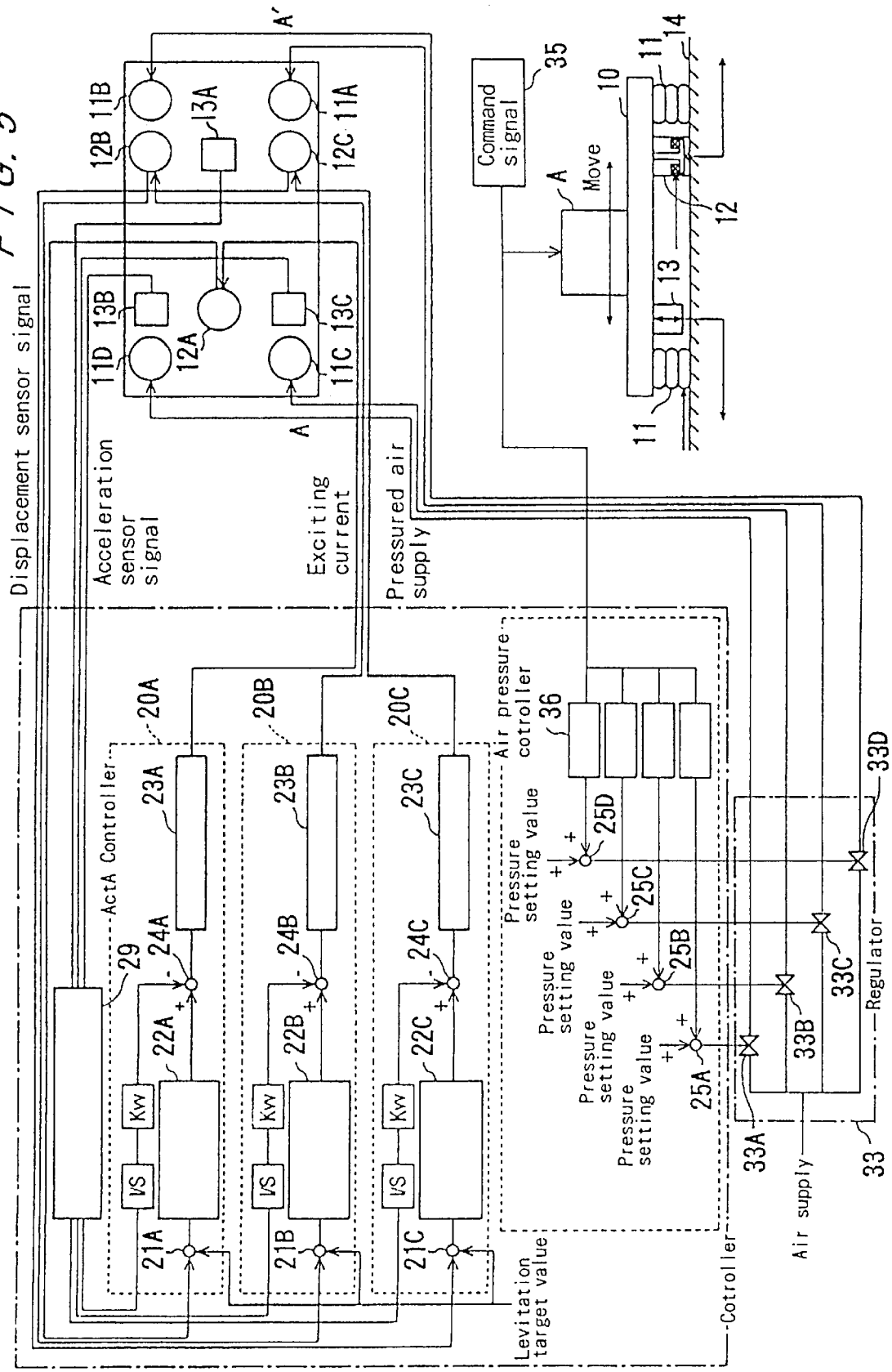
FIG. 5 is a detailed representation of control circuits for the second embodiment.

FIGS. 4 and 5 show an outline of the control system of a second embodiment and its detailed circuit configuration, respectively. Vibration-sensitive objective equipment A is placed on the anti-vibration table 10 which is supported in the vertical direction at its four corners with air springs 11 and rapid position adjustment is provided by electromagnetic actuators 12 as in the first embodiment. The anti-vibration table 10 is similarly provided with accelerometers 13, and vibration canceling control is provided by the electromagnetic actuators 12 as in the first embodiment. The displacement signals generated by the displacement sensors housed in the electromagnetic actuators 12 are inputted to the position compensation device 22, and are supplied as excitation current to the coils of the electromagnetic actuators 12 through power amplifiers 23 to adjust the levitation position of the anti-vibration table so as to keep the table level.

Also, the air pressure control mechanism of the second embodiment is the same as that of the first embodiment. The air pressure control mechanism uses air springs 11A, 11B, 11C, and 11D disposed at four corners of the table 10 to support the load of the table including objective equipment. The air pressure control mechanism also uses an adjustment in the air pressures to maintain level position of the table. The difference in the second embodiment is that an objective equipment location controller 35 is provided on the table 10 to control the planar position of the objective equipment A. This controller 35 is a controller that uses an X-Y stage on the table, for example, for moving the objective equipment A in orthogonal directions, and produces X-position signals and Y-position signals according to the moving position of the objective equipment A in the X and Y directions. The command signals for moving the object A are generated by the controller 35 and are forwarded to the air pressure control device 36. The values of the air pressures necessary for maintaining the table 10 level are computed by the feed forward (FF) control device 36, and these values are added to the pressure settings. The pressures in the air springs are adjusted through the regulator 33.

Therefore, even if the objective equipment A is moved some distance, the movement signal is output by the objective equipment location controller 35 and the on-site compensations of air pressures are computed by the feed forward (FF) compensation device 36 to correspond with the amount of movement of the center of gravity, and the air pressures in the air springs are adjusted accordingly. The air pressures are adjusted to compensate for the change of load in the air springs, and the table 10 is maintained level. Also, if the table 10 is moved a distance, the displacement sensors housed in each of the electromagnetic actuators 12A, 12B and 12C detect vertical displacement values. The action-point values for the electromagnetic actuators 12A, 12B and 12C are computed by the position compensation device 22, and are supplied as excitation currents to the coils of the actuators to rapidly maintain the table 10 in the normal levitation position. By using the combined controls of electromagnetic actuator adjustments based on displacement signals together with air pressure adjustments in the air springs, the levitation position adjustments by the electromagnetic actuators can be carried out very rapidly while the level maintenance action by the air springs can be carried out without consuming electric power. The overall response of the system is quite good, and leveling of the table can be carried out with high speed response by the electromagnetic actuators and without increasing the consumption of the electrical power by the air springs. Therefore, even if the center of gravity of the table is moved a large distance by moving the object A, the anti-vibration table can be kept in a level position without increasing the electrical capacity of the electromagnetic actuators.

It should be noted that the vibration canceling control process was illustrated by a feedback process of integrating the acceleration signals and multiplying the integral by a gain coefficient. However, it is also possible to further add the acceleration signals for feedback of total sum data. Also, three electromagnetic actuators and accelerometers were used in the embodiment, but any number of such devices may be used depending on the needs of the system.

It has been demonstrated that by utilizing either the output signals from the compensation circuit based on the displacement sensor signals housed in accelerometers for levitation position control of the anti-vibration table, or the output signals from the feed forward compensation circuit based on the planar position signals for the objective equipment placed on the anti-vibration table, it is possible to adjust the air pressures in the air springs supporting the corners of the anti-vibration table. Therefore, even if the center of gravity of the objective equipment on the table moves over a large distance, the table is held approximately in the target level position. Therefore, the electromagnetic actuators are used primarily to provide rapid restoration of the anti-vibration table to the target levitation position, and to provide anti-vibration control actions based on acceleration data, so that the capacity of electromagnets needed to perform overall vibration control does not have to be increased excessively.

Although a certain preferred embodiment of the present invention has been shown and described in detail, it should be understood that various changes and modifications may be made therein without departing from the scope of the appended claims.

What is claimed is:

1. A vibration cancellation apparatus for isolating an anti-vibration table from floor vibration and for canceling vibration of an objective equipment on the anti-vibration table which produces a load on the anti-vibration table, said apparatus comprising:

at least three electromagnetic actuators operable to support and move the anti-vibration table;

at least three displacement sensors, each in a respective electromagnetic actuator, each operable to detect a vertical position of the anti-vibration table to output a displacement signal indicative of the vertical position of the anti-vibration table, wherein the vertical position in each of the displacement sensors changes in response to a change in the load of the objective equipment which corresponds to a movement of a center of gravity of the anti-vibration table caused by movement of the objective equipment on the anti-vibration table;

at least three acceleration sensors, to be connected to the anti-vibration table, each operable to detect vertical accelerations of the anti-vibration table at the respective acceleration sensor and to output an acceleration signal indicative of the vertical accelerations at the respective acceleration sensor;

a first compensation circuit for generating first compensation signals corresponding to the displacement signals from said displacement sensors, respectively;

a second compensation circuit for generating corresponding second compensation signals based on the acceleration signal from said acceleration sensors, respectively;

levitation position control means for controlling said electromagnetic actuators based on the first compensation signals;

vibration canceling control means for controlling said electromagnetic actuators based on the second compensation signals;

air spring actuators to be placed in contact with the anti-vibration table and operable to support and move the anti-vibration table by air pressure in said air springs, said air spring actuators operable for supporting four corners of said anti-vibration table by air pressure, said air pressure of each air spring actuator being independently adjustable by air pressure control means respectively, said air in each of said air spring actuator being controlled in response to a change of load weight which corresponds to a movement of gravity caused by movement of said objective equipment on said anti-vibration table; and a control output distributor for receiving the first compensation signals from said first compensation circuit and for converting the first compensation signals to respective air pressure signals;

whereby said movement of said objective equipment on said anti-vibration table causes output signals from said first compensation circuit based on said movement of said objective equipment, and said output signals from said first compensation circuit are supplied to control output distributor and converted to air pressure signals to each of said air spring pressure control means therein.

2. A vibration cancellation apparatus as claimed in claim 1, wherein said acceleration sensors are each installed at a different location than said electromagnetic actuators, said vibration cancellation apparatus further comprising:

an acceleration point transformation device for converting the acceleration signals from said acceleration sensors indicative of the vertical accelerations at the respective acceleration sensors into equivalent action-point signals indicative of vertical accelerations at the electromagnetic actuators.

3. A vibration cancellation apparatus as claimed in claim 1, wherein said first compensation circuit is operable for producing output signals so as to keep the anti-vibration table to be levitated at a target value.

4. A vibration cancellation apparatus as claimed in claim 1, wherein said second compensation circuit is operable for producing output signals so as to reduce vibrations of the anti-vibration table.

5. A vibration cancellation apparatus for isolating an anti-vibration table from floor vibration and for canceling vibration of an objective equipment on the anti-vibration table which produces a load on the anti-vibration table, said apparatus comprising:

at least three electromagnetic actuators operable to support and move the anti-vibration table;

at least three displacement sensors, each in a respective electromagnetic actuator, each operable to detect a vertical position of the anti-vibration table at the respective electromagnetic actuator and to output a displacement signal indicative of the vertical position of the anti-vibration table at the respective electromagnetic actuator, wherein the vertical position in each of the displacement sensors changes in response to a change in the load of the objective equipment at the respective electromagnetic actuator which corresponds to a movement of a center of gravity of the anti-vibration table caused by movement of the objective equipment on the anti-vibration table;

at least three acceleration sensors, to be connected to the anti-vibration table, each operable to detect vertical accelerations of the anti-vibration table at the respective acceleration sensor and to output an acceleration signal indicative of the vertical accelerations at the respective acceleration sensor;

a first compensation circuit for generating first compensation signals corresponding to the displacement signals from said displacement sensors, respectively;

a second compensation circuit for generating corresponding second compensation signals based on the acceleration signals from said acceleration sensors, respectively;

levitation position control means for controlling said electromagnetic actuators based on the first compensation signals;

vibration canceling control means for controlling said electromagnetic actuators based on the second compensation signals;

air spring actuators to be placed in contact with the anti-vibration table and operable to support the anti-vibration table by air pressure in said air springs;

a location controller for controlling movement of the objective equipment and for outputting location signals indicative of the movement of the objective equipment controlled by said location controller;

a feedforward controller for converting the location signals from said location controller to equivalent air pressure signals; and air pressure control means for receiving the air pressure signals from said feedforward controller and for controlling the air pressure in each of said air springs independently based on the air pressure signals.

6. A vibration cancellation apparatus as claimed in claim 5, wherein said acceleration sensors are each installed at a different location than said electromagnetic actuators, said vibration cancellation apparatus further comprising:

an acceleration point transformation device for converting the acceleration signals from said acceleration sensors indicative of the vertical accelerations at the respective acceleration sensors into equivalent action-point signals indicative of vertical accelerations at the electromagnetic actuators.

7. A vibration cancellation apparatus as claimed in claim 5, wherein said first compensation circuit is operable for producing output signals so as to keep the anti-vibration table to be levitated at a target value.

8. A vibration cancellation apparatus as claimed in claim 5, wherein said second compensation circuit is operable for producing output signals so as to reduce vibrations of the anti-vibration table.

* * * * *